US008467500B2

(12) United States Patent
Hidajat

(10) Patent No.: US 8,467,500 B2
(45) Date of Patent: Jun. 18, 2013

(54) METHOD AND DEVICE FOR LAUNCHING APPLICATION TRIGGERED BY INITIATION OF TELEPHONE CALL

(76) Inventor: Robert S. Hidajat, Ames, IA (US)

( * ) Notice: Subject to any disclaimer, the term of this patent is extended or adjusted under 35 U.S.C. 154(b) by 0 days.

(21) Appl. No.: 12/784,127

(22) Filed: May 20, 2010

(65) Prior Publication Data

US 2010/0296642 A1    Nov. 25, 2010

Related U.S. Application Data

(60) Provisional application No. 61/179,721, filed on May 20, 2009.

(51) Int. Cl.
*H04M 11/04* (2006.01)
(52) U.S. Cl.
USPC .............................. 379/37; 455/466; 455/521
(58) Field of Classification Search
USPC .................. 379/37, 38, 45, 47, 48, 51, 88.11, 379/88.13, 88.12, 201.06; 455/466, 521, 455/456.1, 457
See application file for complete search history.

(56) References Cited

U.S. PATENT DOCUMENTS

| | | | | |
|---|---|---|---|---|
| 5,805,670 | A * | 9/1998 | Pons et al. | 379/45 |
| 7,212,111 | B2 * | 5/2007 | Tupler et | 340/539.18 |
| 7,221,928 | B2 * | 5/2007 | Laird et al. | 455/404.1 |
| 2002/0042846 | A1 * | 4/2002 | Bottan et al. | 709/249 |
| 2003/0112945 | A1 * | 6/2003 | Brown et al. | 379/201.01 |
| 2004/0152441 | A1 * | 8/2004 | Wong | 455/404.1 |
| 2004/0203622 | A1 * | 10/2004 | Esque et al. | 455/412.1 |
| 2006/0063541 | A1 * | 3/2006 | Ryu | 455/466 |
| 2007/0173237 | A1 * | 7/2007 | Roundtree | 455/414.1 |
| 2008/0070609 | A1 * | 3/2008 | Ackley | 455/466 |
| 2010/0195805 | A1 * | 8/2010 | Zeigler et al. | 379/45 |
| 2011/0105076 | A1 * | 5/2011 | Bot | 455/404.2 |
| 2011/0222670 | A1 * | 9/2011 | Sellers et al. | 379/45 |

* cited by examiner

*Primary Examiner* — Olisa Anwah
(74) *Attorney, Agent, or Firm* — McKee, Voorhees & Sease, P.L.C.

(57) ABSTRACT

A telephone or telephone system launches an application upon the dialing of a trigger telephone number. The application may be an electronic message generator that sends an electronic message to one or more recipients upon a telephone number being dialed. One or more text messages may be sent by a telephone or telephone system when a user dials an emergency number with the telephone or telephone system. Real time information such as geographic location information may be automatically generated by the application and included in the electronic messages that are sent after being triggered by a telephone call.

21 Claims, 15 Drawing Sheets

```
                                            ,-22

┌─────────────────────────────────────┐
│                                     │
├─────────────────────────────────────┤
│ RECORD SETTINGS                     │
├─────────────────────────────────────┤
│ SET TRIGGER NUMBER                  │
│ 777                                 │
├─────────────────────────────────────┤
│ SET MESSAGE                         │
│ I NEED HELP! PLEASE SEND HELP...    │
├─────────────────────────────────────┤
│ SET TARGETS                         │
│ JOE FRIEND, ANNIE FAMILY            │
├─────────────────────────────────────┤
│ SAVE RECORD                         │
├─────────────────────────────────────┤
│                                     │
│                                     │
│                                     │
└─────────────────────────────────────┘
```

*Fig. 12*

METHOD AND DEVICE FOR LAUNCHING APPLICATION TRIGGERED BY INITIATION OF TELEPHONE CALL

CROSS-REFERENCE TO RELATED APPLICATIONS

This application claims priority under 35 U.S.C. §119 to provisional application Ser. No. 61/179,721 filed May 20, 2009, herein incorporated by reference in its entirety.

FIELD OF THE INVENTION

This invention relates generally to telephones or telephone systems and methods of using telephones or telephone systems.

BACKGROUND OF THE INVENTION

Telephone calls are the primary mechanism for people to communicate with each other by voice when located remotely from each other. The process of initiating a telephone call involves inputting a telephone number associated with the receiving telephone line into the initiating telephone. Commonly this is referred to as dialing the telephone number, though any number of mechanisms may actually be used to enter the destination telephone number. More recently, telephones have also been provided with the ability to generate and send electronic messages such as text messages and electronic mail. Such devices have also been provided with computer processing units that permit them to launch and execute other applications.

The act of sending an electronic message from a telephone consists of entering a sequence of destination telephone numbers or destination email addresses, composing the electronic message, and sending it. The electronic message may include text, image, voice recording, video recording or other contents. Telephone calls are well suited for two-way voice communication. Electronic messages are well suited for one way communication, and the broadcasting of information to several recipients at once.

Conveying information via a telephone call takes a relatively long time, and is prone to interruptions. Before users can start conveying their message, they have to wait for the destination party to receive the call. After the call is received, various factors can cause the call to be interrupted before the entire message is conveyed. When an interruption occurs, and the call is disconnected, users have to repeat the process of making a telephone call and waiting for the destination party to receive the call before they can complete conveying their message. In comparison, sending an electronic message may require a relatively short time because there is no need to wait for the destination party to receive the call, and because once it is sent, it is less prone to interruption. It also provides a relatively permanent record of the information that is being conveyed.

In the event of an emergency, many telephone users will immediately make a call to request emergency services. In the United States, this is done by making a telephone call to 911. However, the inherent limitations involved with making a telephone call may limit the effectiveness of this action. Users must wait for the 911 operator to accept the call before they can convey their emergency situation and request help. Various factors may cause the call to be interrupted before the user can convey all of the information needed by the 911 operator to provide necessary help. If the telephone user is in a situation where they are unable to speak or where it will be dangerous to make noise, it can be difficult for the 911 operator to comprehend the user and to send the emergency services to the correct location.

In addition to emergency situations, there are other instances where it is desirable for third parties to be aware that the telephone user has placed a telephone call to a particular destination telephone number. For example, parents may wish to know when their children have made a telephone call to particular numbers, as well as the physical location of the child when they made the telephone call. Similar concerns may exist for businesses monitoring the activity of employees using telephones.

These difficulties and others are at least partially overcome or improved upon by the present invention. The examples mentioned in this section are not exhaustive of the problems overcome by the present invention and there may be additional benefits and uses for the invention that will be apparent in light of the following description of the invention.

SUMMARY OF THE INVENTION

It is an object of the present invention to overcome the difficulties noted above by launching an application that automatically composes and sends electronic messages from a telephone or a telephone system when a telephone call is made to a predefined telephone number.

It is a further object of the present invention to enable a telephone or a telephone system to monitor outgoing telephone call numbers and launch an application if an outgoing call is made to a telephone number that matches a predefined trigger telephone number.

According to one embodiment, the present invention is a method of automatically composing and sending electronic messages from a telephone or a telephone system. The method includes providing a telephone or a telephone system that has an electronic storage medium, a computer processor, and a transmitter for transmitting voice information and electronic messages. A trigger number, a text message, and one or more text destination addresses are input into a database on the electronic storage medium. A telephone call is initiated by inputting a telephone number into a telephone or a telephone system. The input telephone number is compared with the trigger number using the computer processor. If the telephone number matches the trigger number, the text message corresponding to the trigger number is sent to the predefined text destination addresses. The location of the telephone or telephone system at the time the telephone call is initiated may be inserted into the text message as GPS coordinates or as an address. The trigger number may be an emergency services telephone number. A plurality of text destination addresses may be associated with a single trigger number. A plurality of trigger numbers may be input to be compared with the input telephone number.

According to another embodiment, the present invention is directed to a telephone or telephone system that includes a transmitter that transmits electronic messages. An input mechanism permits input of a telephone number corresponding to a remote telephone line such that the transmitter will attempt to connect a voice data telephone call to the remote telephone when the telephone number is entered into the input mechanism. An electronic storage medium includes a trigger numbers database having a first trigger number associated with a first predefined text message and a first text message destination address. A programmable processor can monitor outgoing telephone calls and compare the telephone number with the trigger numbers database. The programmable processor is adapted to cause the transmitter to transmit the first predefined text message to the first text message destination address when the telephone number called matches the first trigger number. The telephone or telephone system may include a GPS unit. The programmable processor may be adapted to insert a location identifier into the first predefined text message based on information received from the GPS unit. The trigger numbers database may include a plurality of trigger numbers. The first predefined text message may be associated with a plurality of first text message destination addresses. The telephone system may be provided entirely within a single telephone.

According to another embodiment, the present invention is a telephone or a telephone system that has an electronic storage medium including a database comprising a predefined electronic message associated with a trigger telephone number and a destination address. The telephone or telephone system also includes a transmitter for transmitting electronic messages. A processor monitors outgoing telephone calls and sends the predefined electronic message to the destination address if an outgoing telephone call is initiated to the trigger number. The trigger number may correspond to an emergency services telephone number. The telephone or telephone system may further include a GPS receiver such that the predefined electronic message includes an indicator of a location of the telephone or telephone system. The predefined electronic message may be associated with a second destination address, such that if an outgoing telephone call is initiated that corresponds to the trigger number the processor signals the transmitter to send the predefined electronic message to the second destination address. The predefined electronic message may be sent without interrupting the outgoing telephone call. The database may further include a second predefined electronic message associated with a second trigger telephone number and a second destination address, wherein the processor is adapted to send the second predefined electronic message to the second destination address when an outgoing telephone call is initiated to the second trigger number.

BRIEF DESCRIPTION OF THE DRAWINGS

FIG. 12 shows a display screen of a telephone or a telephone system according to the present invention at a record settings menu.

DETAILED DESCRIPTION OF THE PREFERRED EMBODIMENTS

The present invention relates generally to a telephone or a telephone system and methods for using such a telephone or telephone system. The term telephone is used herein to refer to a variety of communication devices capable of connecting to other similar devices to permit voice communication between two users. The term telephone system is used herein to refer to a telephone used in combination with a personal computer or other electronic device. Each telephone or telephone system is associated with a unique telephone number used to identify the telephone or telephone system for incoming and outgoing telephone calls. This unique identifier is usually referred to as a telephone number. The present invention is particularly well suited for use with telephones or telephone systems that include the ability to send and receive electronic messages, such as text messages and electronic mail. In its most general form, the present invention is a telephone or a telephone system and method of using the telephone or telephone system that monitors telephone numbers dialed by the telephone or telephone system, and if a dialed telephone number matches a predefined trigger telephone number, initiates another action by the telephone or telephone system. That additional action may be launching an application that automatically sends one or more electronic messages, launching other applications on the telephone or telephone system to perform an action such as recording and broadcasting the telephone conversation, or taking other automated actions. The following detailed discussion and attached drawings illustrate more specific embodiments of the invention.

Figure 1A:
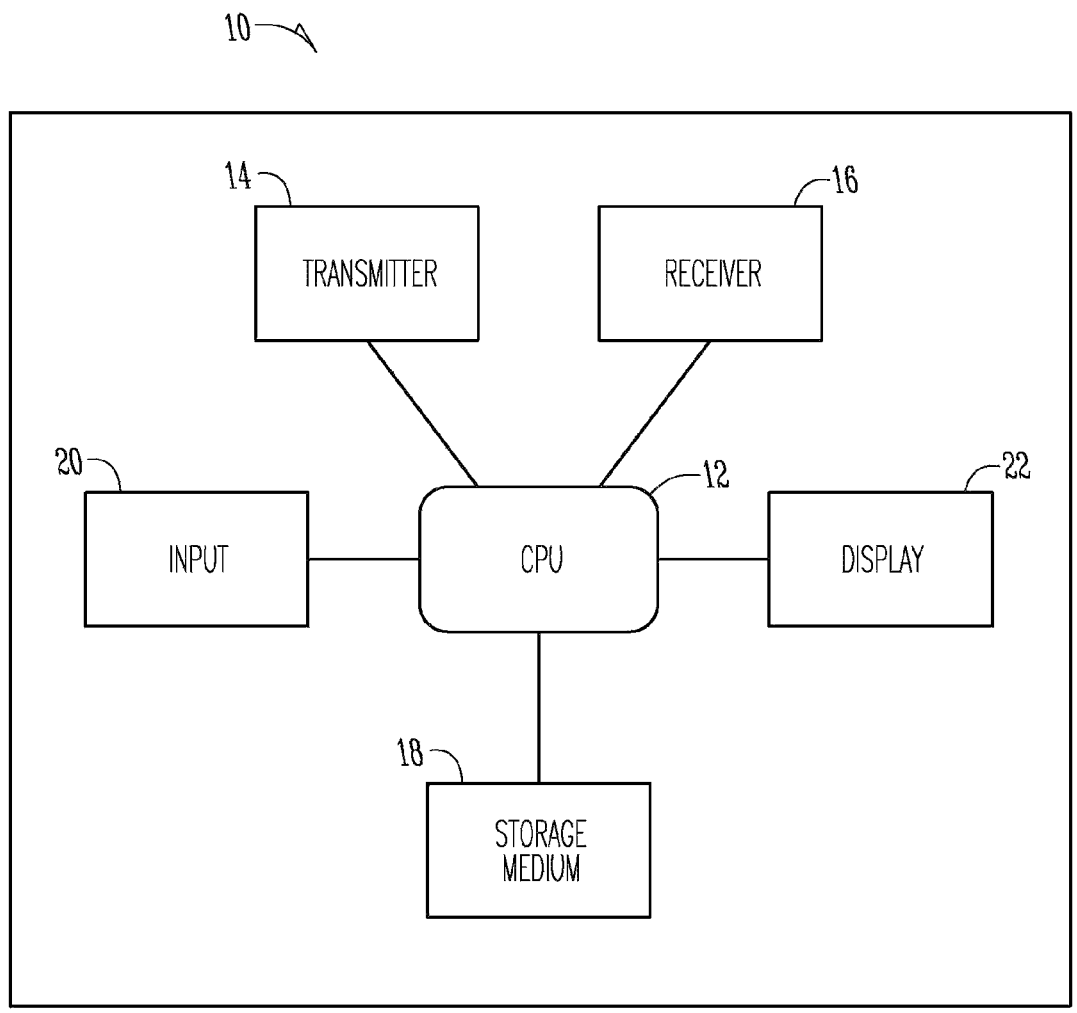
FIG. 1A is a schematic representation of the components of a telephone or a telephone system in accordance with one embodiment the present invention.

FIG. 1A is a schematic diagram of a telephone or telephone system 10 suitable for use in accordance with the present invention. Preferably, but not necessarily, the telephone or telephone system 10 will be a "Smart" telephone that includes a central processing unit 12. The central processing unit (CPU) 12 may take several forms and may include several components. The CPU 12 encompasses the components necessary to control the various other components of the telephone or telephone system 10. The CPU 12 should be programmable, such that a user can add applications and logic routines that will be run on a CPU 12. The telephone or telephone system 10 should include a transmitter 14 and a receiver 16 for transmitting and receiving voice telephone calls and for transmitting and receiving digital data. In practice, the telephone may include separate transmitters and receivers for various types of data. The digital data may include electronic messages, such as text messages (e.g., SMS) or electronic mail (e.g., MIME). An electronic storage medium 18 is provided in association with the CPU 12. The electronic storage medium 18 can be accessed by and written upon by the CPU 12. In practice more than one storage media may be provided in association with the CPU 12. An input mechanism 20 permits a user to input information into the telephone or telephone system 10, and in particular, directly to the CPU 12. The input mechanism 20 may be buttons, a touch screen, voice recognition equipment, or other known means for permitting a user to input information into the CPU 12. In addition to a dedicated input provided on the telephone or telephone system 10, the telephone or telephone system 10 may have an input jack that permits the telephone or telephone system 10 to be placed in electronic connection with an external input device, such as a personal computer. Additionally, the receiver equipment 16 may be utilized to receive input from remote external devices. Also, it should be appreciated that the CPU 12 and storage medium 18 might be physically separate from the transmitter 14 and receiver 16 to form a telephone system.

Figure 1B:
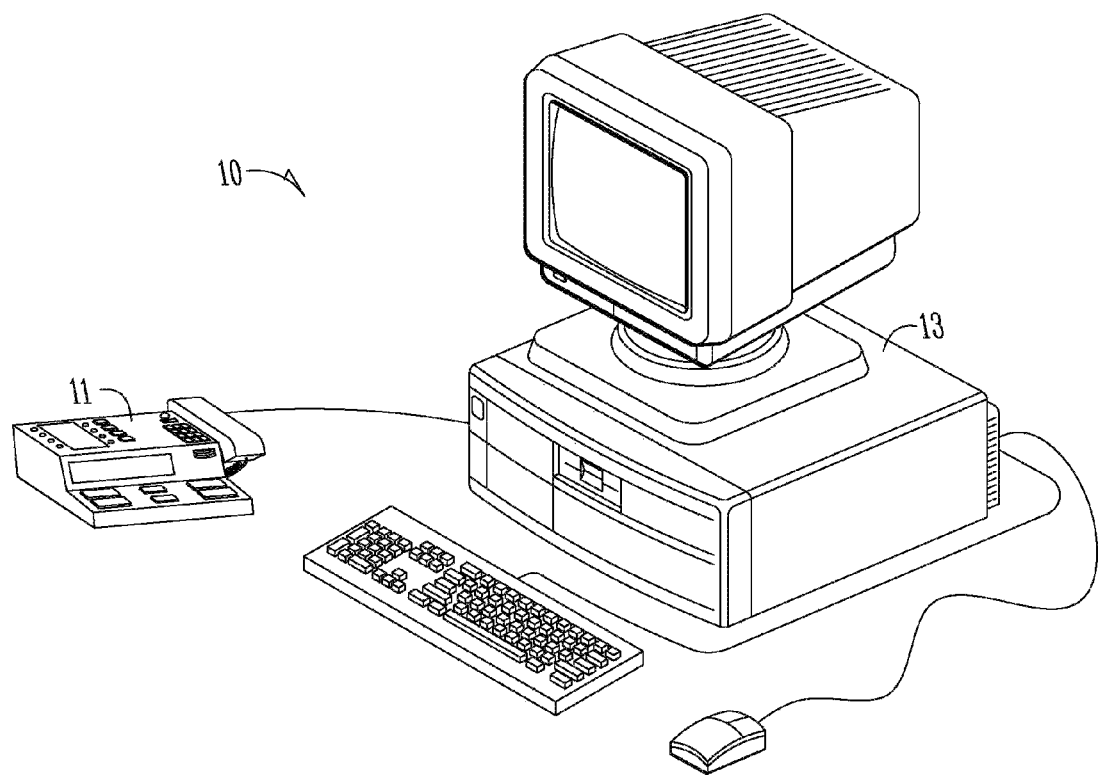
FIG. 1B is a schematic representation of a telephone system according to one embodiment of the present invention that includes a telephone in connection with a computer.
Figure 1C:
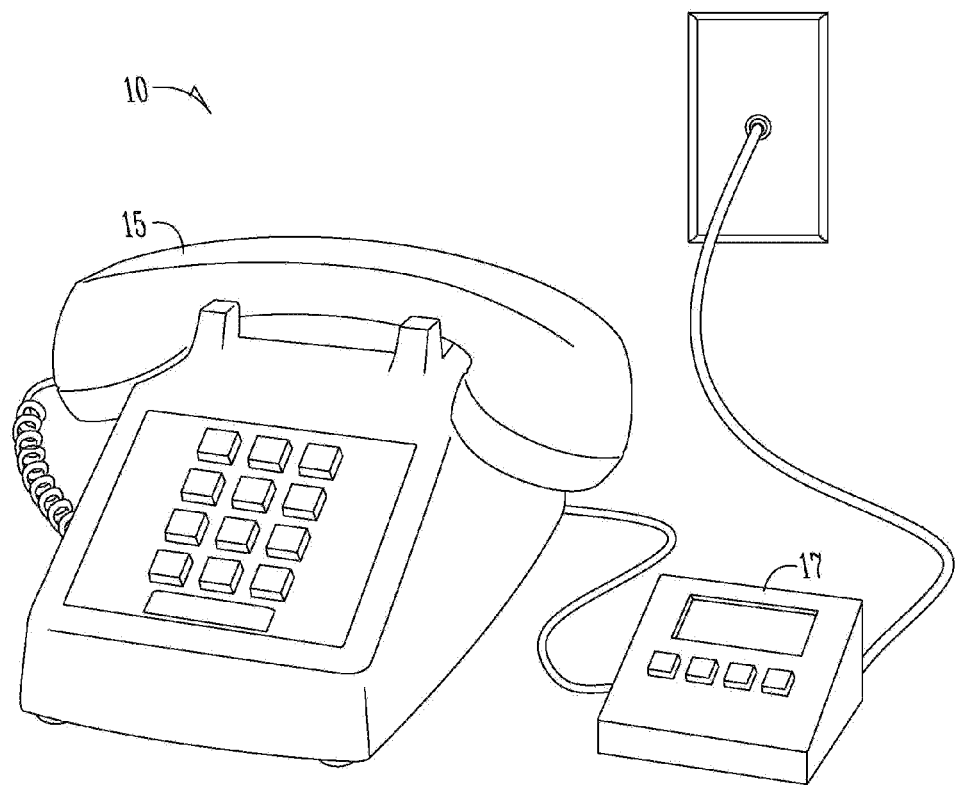
FIG. 1C is a schematic representation of a telephone system according to another embodiment of the present invention including a telephone connected to an electronic device.

The telephone or telephone system 10 is not limited to traditional forms. FIG. 1B shows a telephone system 10 wherein a telephone handset 11 is connected to a personal computer 13. The personal computer can monitor outgoing calls made using Voice Over IP programs such as Skype, Windows Messenger, and the like. FIG. 1C shows a traditional landline telephone 15 (not a smart phone or a wireless phone) in connection with specialized hardware 17 that includes a CPU that monitors outgoing calls made using the landline telephone.

The telephone or telephone system 10 may include display equipment 22. The display equipment 22 may include one or more display screens that provide visual of information to a user. The display equipment 22 may be used to show telephone numbers as they are being dialed, and to show an identification of incoming telephone calls. Additionally the display equipment 22 may be utilized to show incoming electronic messages. More generally, the display 22 may be a display screen that provides displays as controlled by the CPU 12, such as control menus and the like. The display equipment 22 may be a touch screen to permit a user to interact with the control menus.

There are numerous commercially available telephones or telephone systems 10 that are suitable for use with the present invention. Suitable telephones or telephone systems should include a programmable processor for running applications that match the operating system of the telephone. Currently commercially available suitable telephones or telephone systems include telephones or telephone systems sold under the brand name Apple iPhone, telephones running the Android Operating System such as Motorola Droid, HTC Nexus One, or HTC Droid Incredible, and numerous models sold under the brand name BlackBerry. The different brands may include the same or different operating systems (OS) and application programming interfaces (API). Therefore, the various different OS and API platforms may require similar but different programming language and different specific details in the programming logic. However, those of ordinary skill in the art will understand how to program the specific models according to their own OS and API needs based upon this disclosure.

Figure 2:
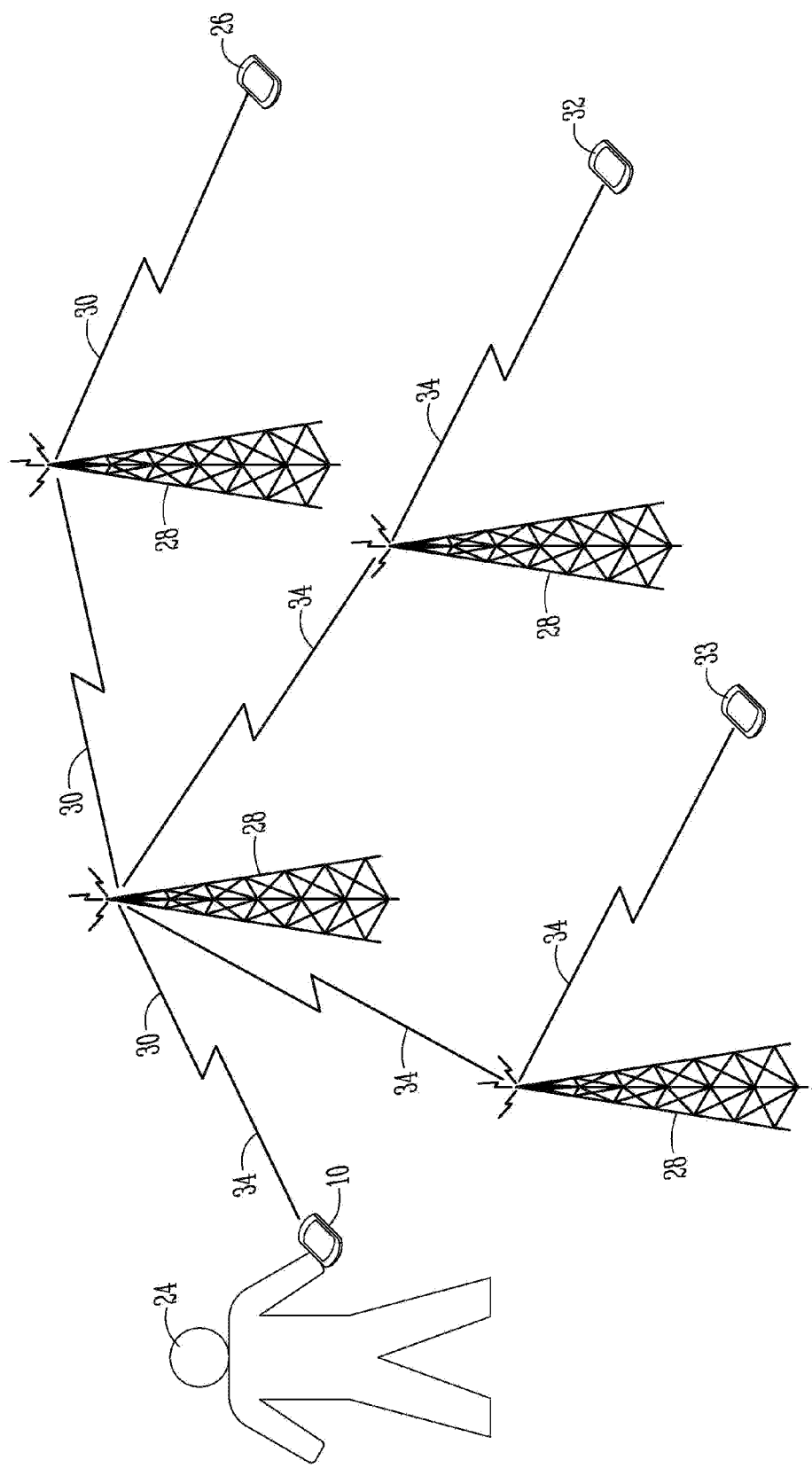
FIG. 2 is a schematic representation of a telephone or a telephone system according to the present invention initiating a telephone call to a first remote telephone and sending an electronic message to two remote receivers that was automatically initiated by dialing the first remote telephone.

FIG. 2 shows a user 24 using a telephone or a telephone system 10 to initiate a telephone call 30 to a first remote telephone or telephone system 26. The remote telephone 26 is associated with a telephone line that has a unique telephone number. The telephone call between the user's telephone or telephone systems 10 and the remote telephone 26 is initiated by the user 24 entering the telephone number and sending the telephone call, which in the case of a cellular telephone is transferred to the remote telephone 26 through a network of cellular telephone towers 28. The telephone call 30 may also be routed through land lines, via satellite, over the Internet, or through other known mechanisms. The telephone call connection 30, if completed, permits the user 24 to exchange voice communication with the remote telephone 26. Simultaneously with, or nearly simultaneously with, the initiation of the telephone call 30, the telephone or telephone system 10 also generates an electronic message 34 that is sent to a first electronic message receiver 32 and to a second electronic message receiver 33 concurrently with the telephone call 30. In practice, the electronic message 34 may be sent to any number of receivers. The electronic message 34 is sent without interrupting the telephone call 30. The electronic message receivers 32 and 33 may be any device suitable for receiving electronic messages. For example the electronic message receiver 32 may be a telephone, a telephone system, a Smart phone, a pager, a text message receiver, or an electronic mail server.

According to one embodiment of the present invention, the electronic message 34 is generated automatically in response to the telephone call 30 being initiated. The telephone or telephone system 10 is provided with a database of trigger telephone numbers. Each time a telephone call 30 is initiated, the telephone or telephone system 10 compares the dialed telephone number with the database of predefined trigger numbers. If the dialed telephone number matches a trigger number, then the telephone or telephone system 10 will send a predefined text message to an electronic message receiver 32 associated with the trigger number. For example, the remote telephone 26 may be an emergency service provider. In the United States, it would be common for the emergency service provider to be associated with the telephone number 911. Therefore, the telephone number 911 might be defined as a trigger number that triggers the initiation of an electronic message to be sent to an electronic message receiver 32. Therefore, after a user 24 dials 911, while the user is communicating by voice with an emergency services provider, the telephone or telephone system 10 will also be sending an electronic message to the user's emergency contacts letting them know that the user 24 has dialed 911. In the case of telephones or telephone systems that include GPS equipment, the user's GPS location information may also be included in the text message so that recipients of the electronic message know the location of the user 24 at the time the emergency telephone call was initiated. Additional information can be added to the electronic message depending upon the nature of the emergency. For example, when a trigger number is dialed, say 911, a dialog box can be displayed on the display of the telephone asking the user what kind of help he/she needs—police, medical or fire—based on what the user selects, this additional information can be embedded in the message. For example, the dialog box might suggest a user can select one or more selection from the following options—police, medical, fire—to include in the text message automatically creating the following example messages:
 I need Help!
 I need police Help!
 I need police, medical Help!
 I need police, medical, fire Help!

It is also possible for the application to implement a delay when a trigger number is dialed. In this delay feature, a dialog can be popped up with a countdown timer telling the user that an emergency electronic message is going to be composed and sent in after a predetermined delay time, for example in 5 seconds. This dialog box may include a cancel button to allow users to cancel the sending of electronic messages if they chose.

According to another feature of the present invention, a trigger number could be set to permit a parent or guardian to monitor when a child user 24 of the telephone or telephone system 10 dials specific telephone numbers. For example, the parent's home telephone 26 number could be set as a trigger number such that a text message is sent to the parent's mobile telephone 32 any time the child tries to use the telephone or telephone system 10 to dial home. That way, if no one is at home, the parent will receive a text message and be aware that the child is trying to call the home telephone or telephone system 26. As with the text sent in emergency situations, it may be advantageous to include GPS information in the parental text message so that the parent knows the geographic location of the child when the call is made.

Figure 3:
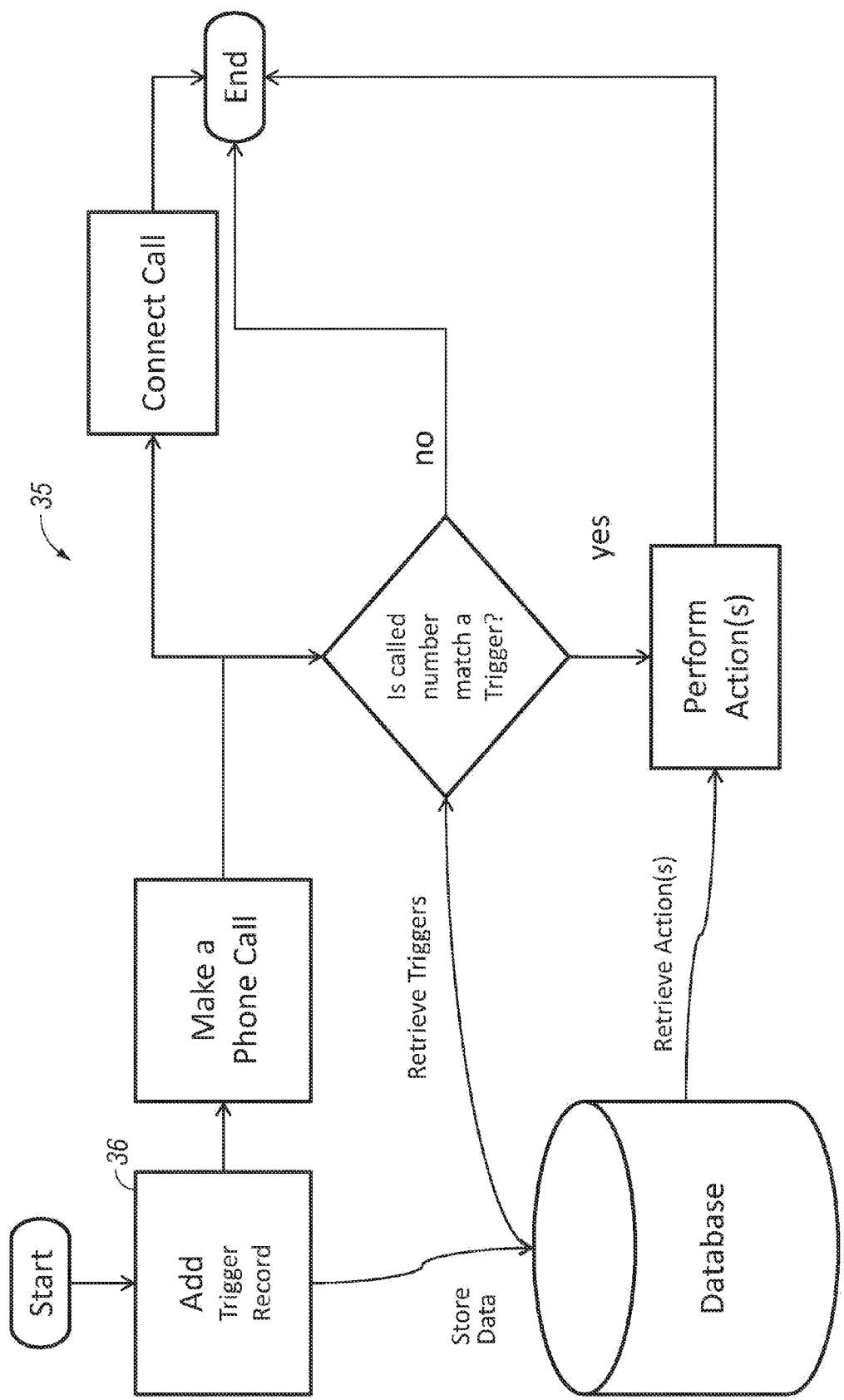
FIG. 3 is a flow chart illustrating the process of triggering a launch of an application based on a dialed telephone number acting as a trigger.

FIG. 3 shows a flow chart of an overview of a process 35 according to one embodiment of the present invention. According to a first step 36, a trigger record is added to a database on an electronic storage medium in the telephone or telephone system 10. Preferably this will be done through an interface provided on the telephone or telephone system 10. The trigger record will include a trigger telephone number and an action to be taken upon placing a telephone call to that trigger telephone number. The next step in the flow chart is to make a telephone call. The telephone call will be connected as with a standard telephone call. The CPU 12 of the telephone or telephone system 10 will check the database to see if the telephone number called matches a trigger telephone number. If the telephone number called does not match a trigger telephone number, then no additional action is taken and the telephone call proceeds in a normal fashion. If the telephone number called does match a trigger telephone number then the action specified in the trigger record will be performed by the CPU 12, without interrupting the telephone call.

Figure 4:
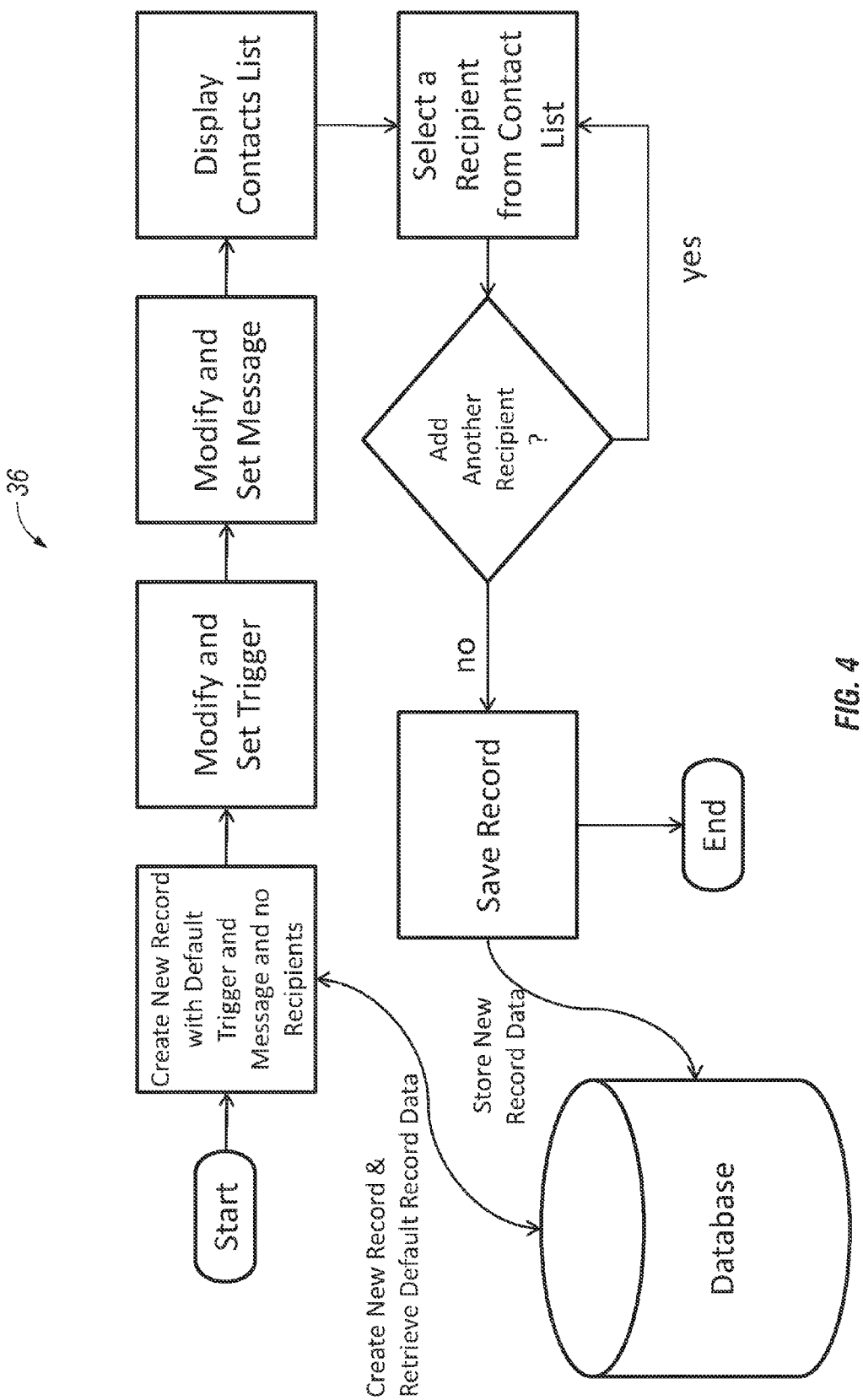
FIG. 4 is a flow chart illustrating the process for creating and saving a record that includes a trigger telephone number that is associated with an electronic message and recipients for the text message.

FIG. 4 shows a flow chart for a process 36 to add a trigger record. The first step is to create the default trigger record that utilizes a default trigger number and default message, and has no assigned recipients as targets for the electronic message. The user can then modify the default record by entering a desired trigger number in place of the default trigger number. The user may then modify the default electronic message to a desired message. A recipient, who will receive the electronic message when the trigger number is dialed on the telephone or telephone system 10, may be selected from the contact information associated with the telephone or telephone system 10. According to this embodiment, a telephone user should first enter desired recipients' contact information, including a destination address, such as an e-mail address, a telephone number associated with a device that can receive text messages, or other identifier of a destination for electronic messages, onto the telephone's contact list prior to initiating the creation of a trigger record. As an alternative, an interface may be provided for directly entering a destination address for the electronic message as part of the trigger record creation process. If the user desires for the electronic message to be sent to more than one recipient, the user may select additional recipients to be associated with the trigger record. Once the trigger record has been completely updated to include the desired trigger number, the desired message, and all of the desired recipients, the trigger record is saved to the database.

Figure 5:
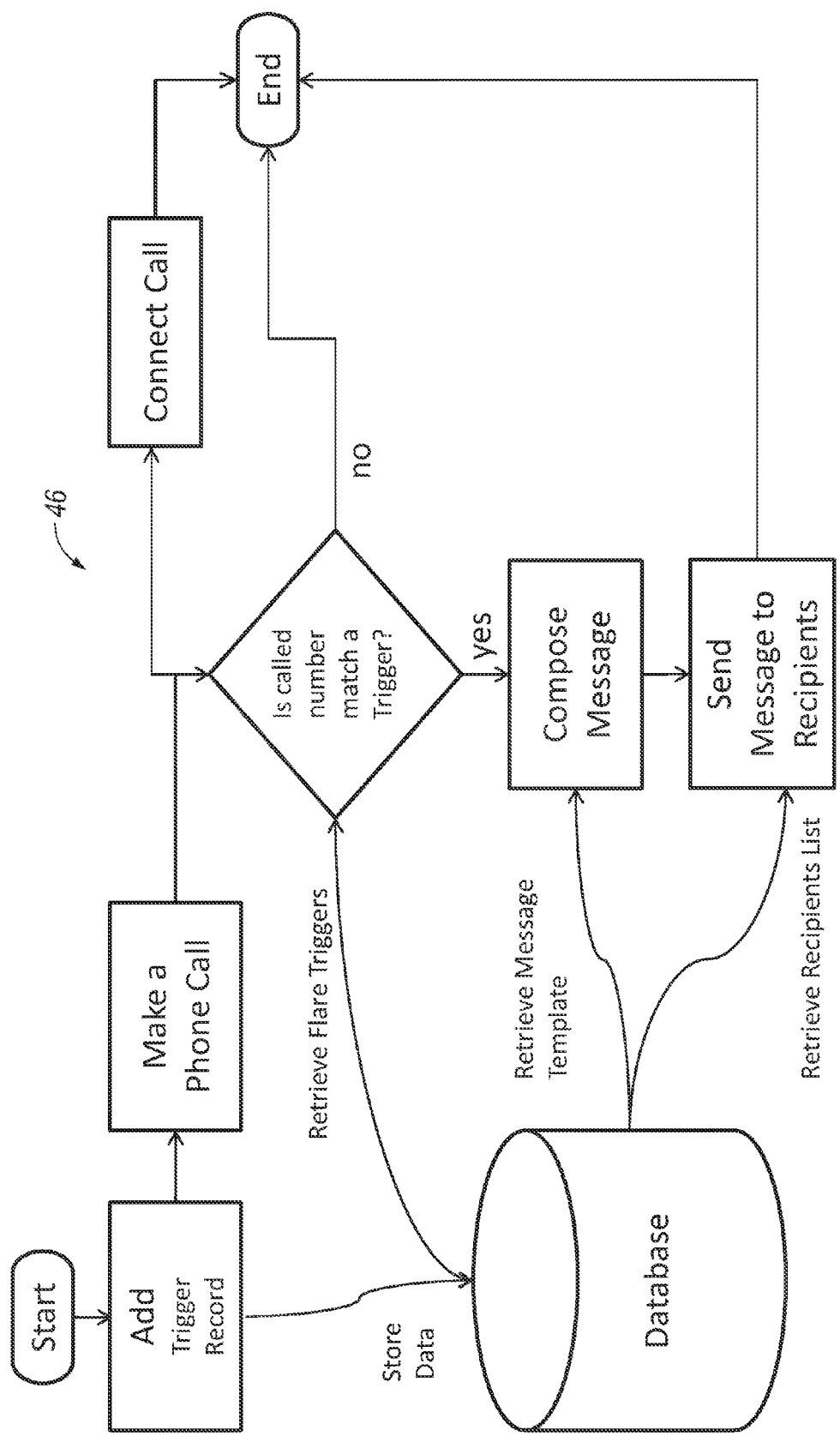
FIG. 5 is a flow chart illustrating the automatic sending of an electronic message based upon a telephone call matching a trigger telephone number.

FIG. 5 is a flow chart illustrating a process 46 to send an electronic message to desired recipients when a specified trigger number is dialed on a telephone or telephone system 10. According to this process, a trigger record is added to the database, for example as shown in the process of FIG. 4. The user then makes a telephone call to a remote telephone or telephone system by dialing a telephone number associated with the remote telephone or telephone system. The call should be connected to the remote telephone or telephone system as normally happens. Additionally, the CPU 12 on the telephone or telephone system 10 will check the database of trigger records to determine whether the dialed telephone number for the remote telephone or telephone system matches a trigger number. If there is no match, then no further action is taken and the telephone call just proceeds as a normal voice telephone call. If the called number matches a trigger number, then the CPU 12 retrieves and composes a message from the database that is associated with the trigger record. The message may be a simple text message or email message with the text previously entered by the user. Alternatively, the message may include additional information added at the time the message is composed, such as an insertion of geographic information. Once the message is completely composed, the telephone or telephone system 10 will transmit the message to the previously selected recipient or recipients. An electronic message will be sent to the recipients simultaneously, or nearly simultaneously with the call being made to the remote telephone.

The trigger number may be set using wild card characters, such as an asterisk to stand for any string of numbers, or a question mark to stand for any single number. The use of wild cards would permit several telephone numbers to act as a trigger associated with a single trigger record. For example, use of wild cards would make it easily possible to select all of the numbers within any single area code to generate a text message. As a further alternative, the wild cards could be used to set every number dialed as a trigger number for a particular message, so that every time a telephone call is made a corresponding electronic message is composed and sent.

Figure 6:
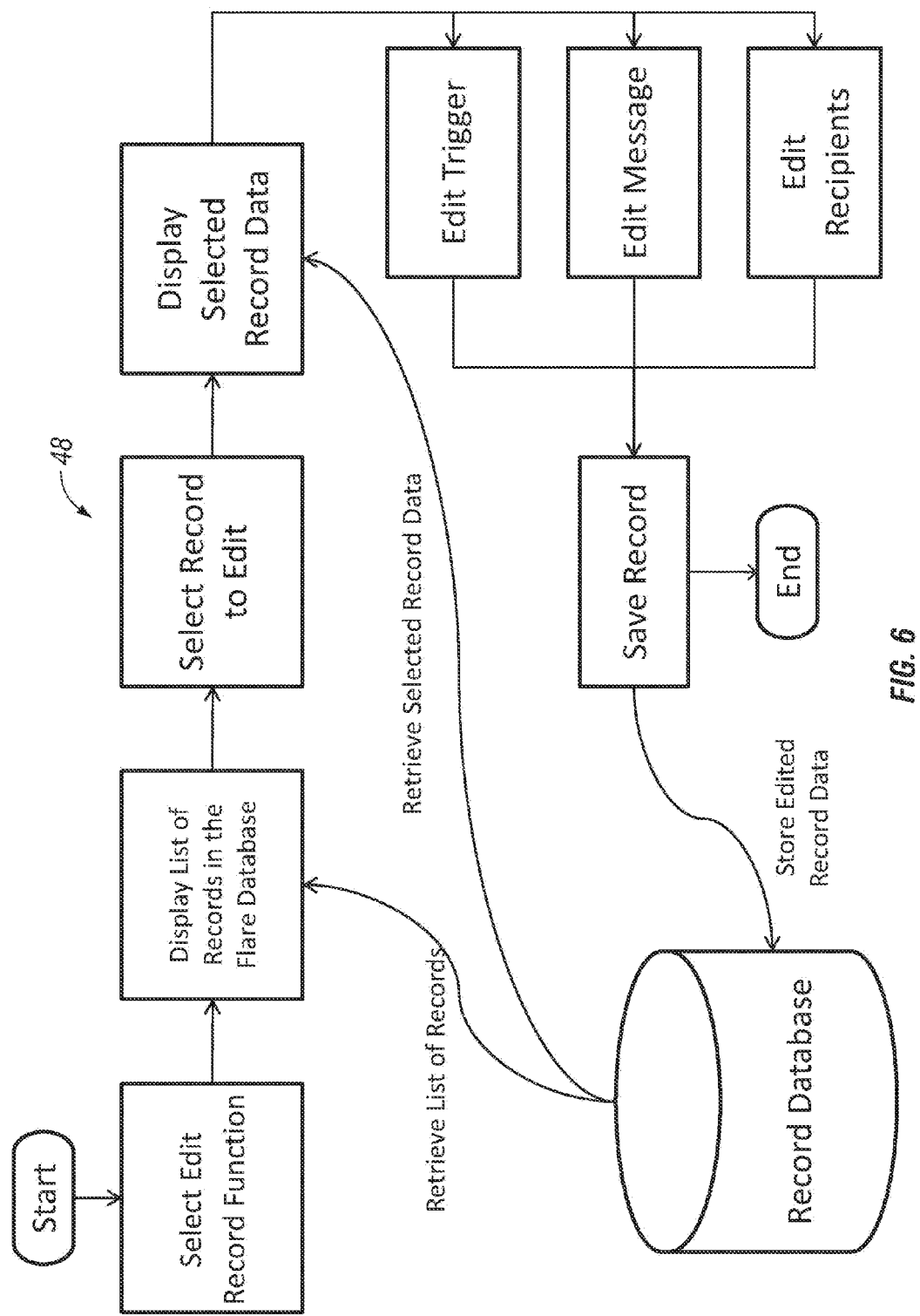
FIG. 6 is a flow chart illustrating a process for editing a record that includes a trigger number, an electronic message, and recipients for the electronic message.

FIG. 6 shows a flow chart of a process 48 for editing existing trigger records. Preferably, this can be done directly by the user within an interface provided on telephone or telephone system 10. This process 48 can be used to add or delete recipients for a message, to revise the message, and to add or delete trigger numbers associated with a particular message and recipients. The first step is to select the edit record function on the telephone or telephone system 10 interface. The interface should provide some mechanism for selecting the desired record to edit. According to one embodiment, the display on the telephone or telephone system 10 will provide a list, for example, in alphabetical order, of trigger records. Alternatively, a search function may be provided to find the desired trigger record to edit. The desired trigger record to be edited is retrieved from the database and displayed on the telephone interface display. The user may then directly edit any or all of the trigger numbers, the content of the electronic message, or the address of the recipients. Once all desired edits have been made, the trigger record can be saved back to the database.

Figure 7:
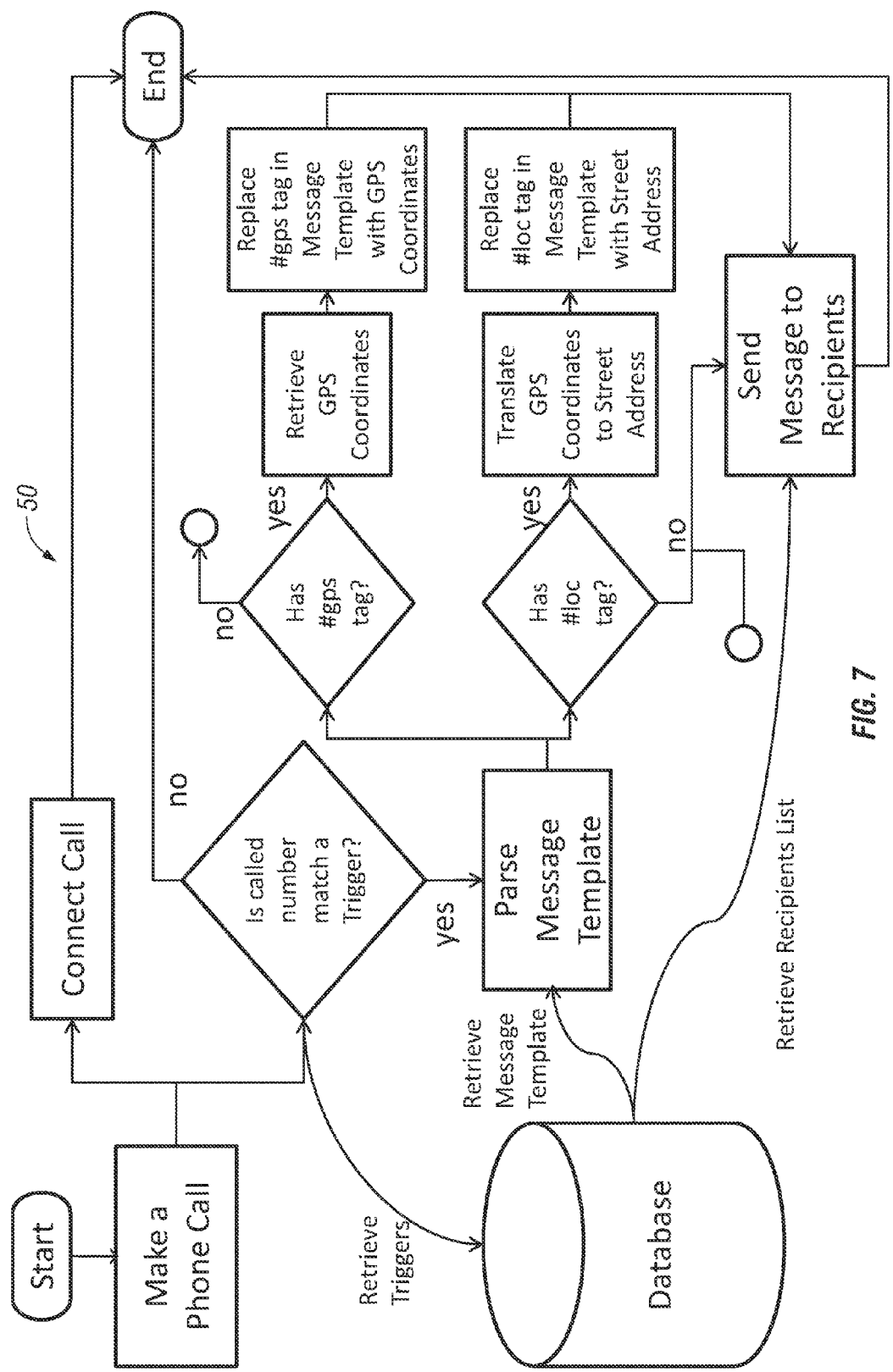
FIG. 7 is a flow chart illustrating a process according to the present invention wherein an electronic message is triggered based on a dialed telephone number, wherein the electronic message includes GPS information.

FIG. 7 shows a process 50 for sending an electronic message to recipients that includes geographic information based on the location of the person initiating a telephone call. A telephone call is made by entering a telephone number associated with a remote telephone or telephone system. The telephone call is connected to the remote telephone or telephone system in a normal fashion. Additionally, the CPU 12 on the telephone or telephone system 10 searches the trigger records database to determine if the called number matches a trigger number. If the called number does not match a trigger number, then no additional action is taken and the telephone call proceeds as is standard. If the called number does match a trigger number, then the CPU 12 retrieves the message template from the trigger record associated with the dialed telephone number of the remote telephone or telephone system. The CPU 12 parses the retrieved message to determine whether it shall includes GPS data. If the message includes a tag for GPS coordinates, then the CPU 12 inserts the GPS coordinates into the text message at the location of the GPS coordinates tag. If the retrieved message includes a GPS street address tag, then the CPU 12 retrieves the GPS street address for the telephone at the time the telephone call was initiated and replaces the GPS address tag with the retrieved street address. Once the message has been fully composed, including any GPS coordinates or GPS street addresses, the electronic message is sent to the recipients associated with the text message in the trigger record. The GPS tags are just examples—many other tags can be defined to correspond to any other additional data that can be automatically generated such as time, username, nature of emergency, and others.

Figure 8:
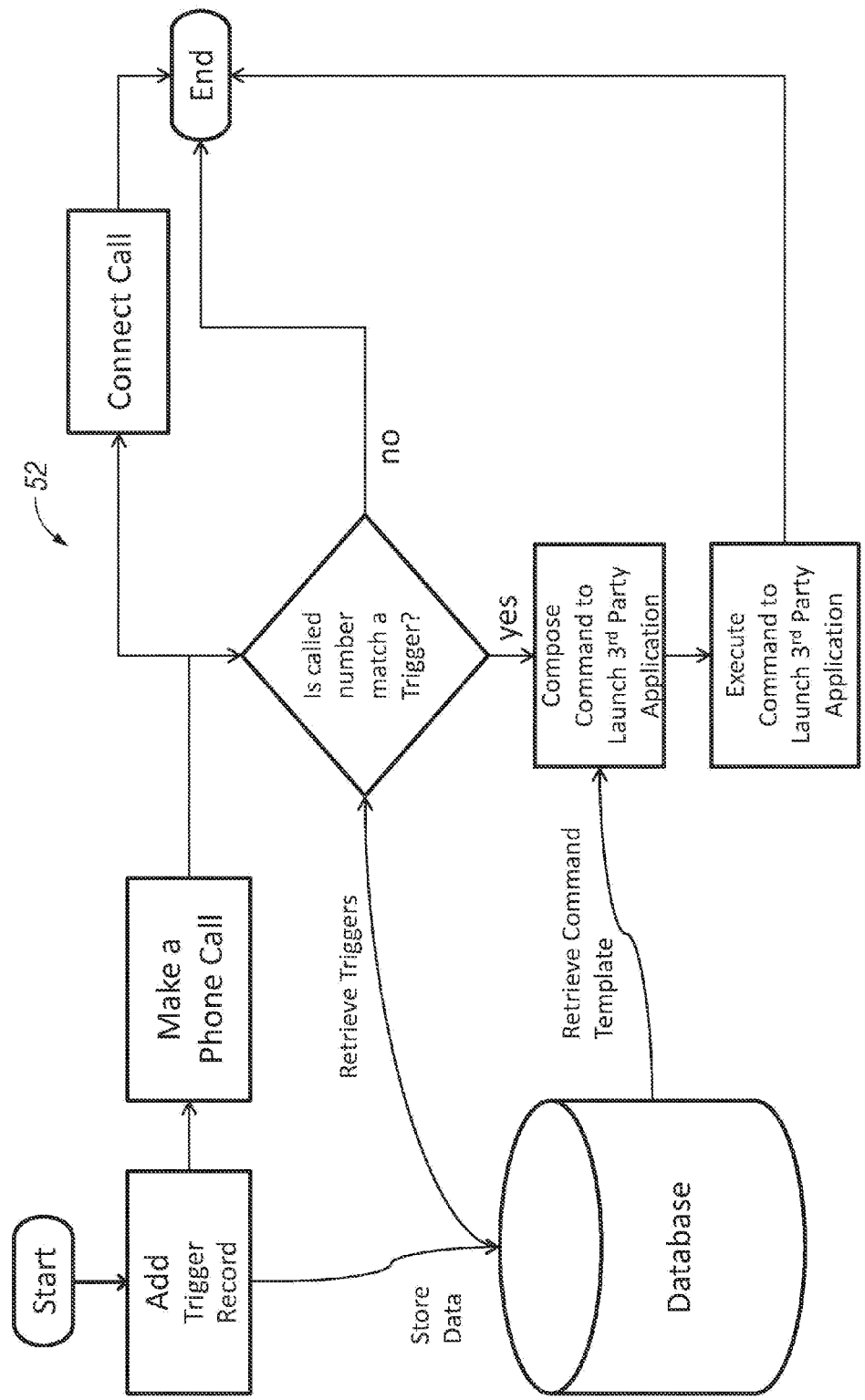
FIG. 8 is a flow chart of a process according to the present invention wherein initiation of a telephone call that matches a trigger number causes execution of commands that launches a third party application.

FIG. 8 shows a process 52 for executing commands to launch third party applications on the telephone or telephone system 10 based upon making a telephone call to a remote telephone or telephone system that matches a trigger number. A trigger record is created and added to a trigger record database. The trigger record should include a trigger number, as well as a command to launch a third party application on the telephone or telephone system. Therefore, when a telephone call is made, the call is connected with a remote telephone or telephone system matching the dialed telephone number. The dialed telephone number is simultaneously, or nearly simultaneously, compared with the trigger numbers in the trigger record database. If the called number does not match a trigger number, then no further action is taken, and the call proceeds as normal. If the called number does match a trigger number from the trigger record database, then the command template is retrieved from the trigger record matching the dialed trigger number and a command to launch a third party application is composed, which causes the third party application to be executed. For example, a trigger number may be associated with a spreadsheet corresponding with a particular customer. Every time a user dials the telephone number for that customer, it could be used to trigger the CPU 12 to open up a spreadsheet that corresponds with that customer so that as the user has a telephone conference with the customer, the customer spreadsheet is available for viewing on the telephone by the user. According to another embodiment, the trigger number triggers the launch of an application to record the telephone call and upon the termination of the call, sends the recorded call to pre-defined destination addresses.

Additional examples of the present invention that launch a third party application based upon a telephone call being made to a trigger number include one wherein a third party application takes a picture or records a video based on upon a trigger number being dialed; one wherein a connection is established with a home security system to trigger an audible or silent alarm; one wherein a connection is established with a user's home automation system to turn on the television; close the curtains, start the fireplace, turn-up or down the furnace, and similar tasks. The present invention may be advantageously used to launch virtually any suitable third party application.

Figure 9:
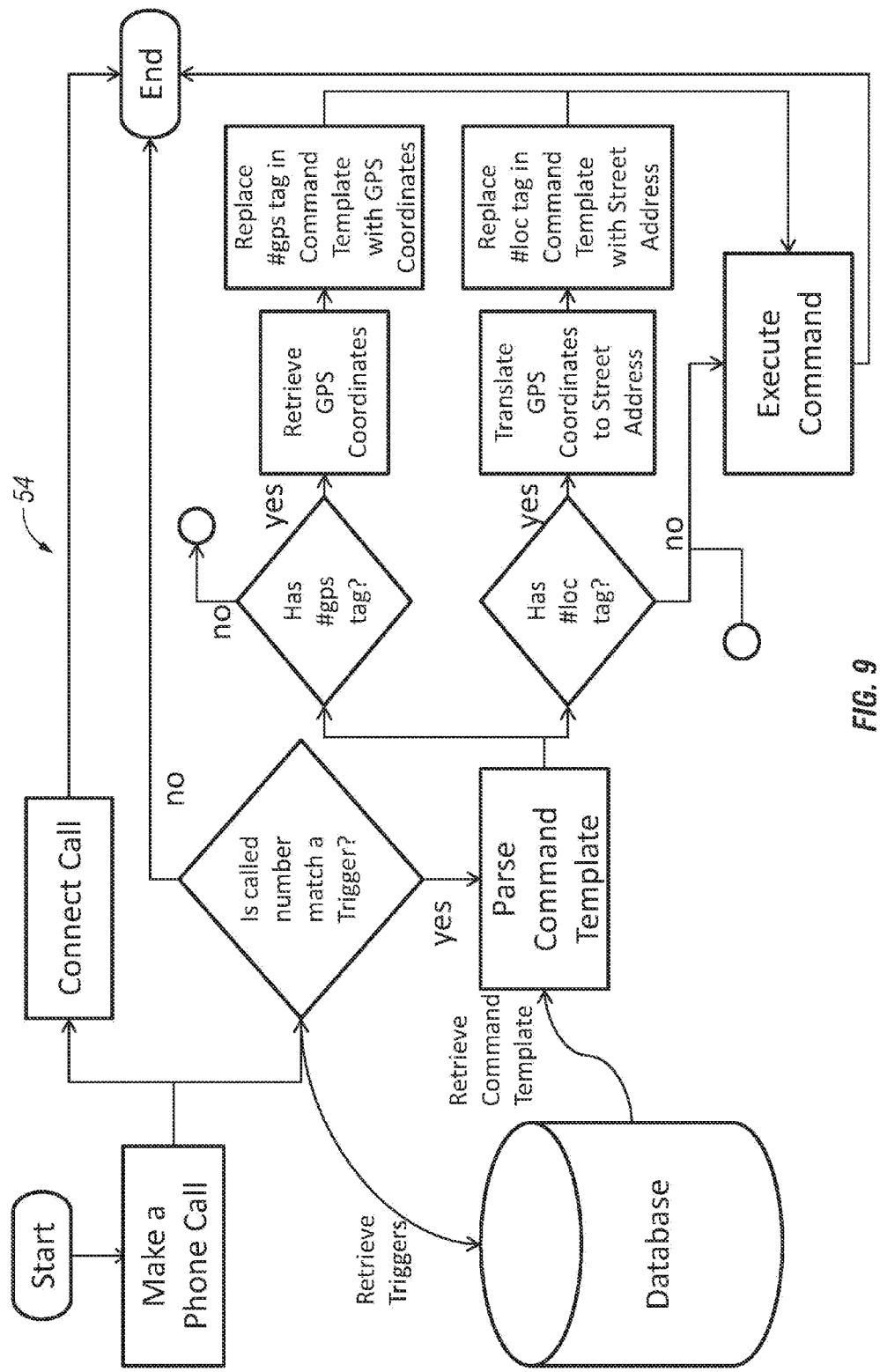
FIG. 9 is a flow chart according to one embodiment of the present invention wherein initiating a telephone call that matches a trigger number causes execution of commands that utilizes GPS coordinates to launch a third party application.

FIG. 9 shows a process for executing commands to launch a third party application upon the dialing of a trigger number, wherein the third party application utilizes GPS data from the telephone or telephone system 10. Therefore, upon initiating a telephone call, the call is connected to a remote telephone or telephone system associated with the number dialed. That dialed telephone number is compared with trigger numbers in the trigger record database. If the called number does not match a trigger number, then no further action is taken and the call proceeds as normal. If the dialed number does match a trigger number, then the command template associated with the trigger record that had a trigger number matching the dialed number is retrieved and parsed to determine whether it includes GPS information. If the command template does include GPS tags, either in the form of GPS coordinates or GPS coordinates translated into a street address, then those GPS tags are replaced with the appropriate information, and the complete command is then executed to launch a third party application utilizing GPS data. For example, the process 54 could be utilized to launch a third party map application that creates a map from the location of the user when they initiated the telephone call to a destination associated with the dialed telephone number. For example, a user could use the feature to generate a map for a return to their home any time they dial their home telephone number. In that instance, the trigger number in the trigger record would be the person's home telephone number. The GPS coordinates for their home could be provided at the time the trigger record is created as the desired destination for a map. Upon initiating a call home, the CPU 12 would recognize the trigger number and utilize the current GPS location of the telephone as the starting point on the map with the already entered home GPS information as the destination, and automatically generate a map from the present location of the telephone to the home address, any time the home telephone number is dialed. According to another example, the trigger number triggers the launch of an application to record the movement or position of the telephone and broadcast the movement or position information periodically to pre-defined recipients. It should be understood that tags other than GPS tags can be defined to correspond to any other additional data that can be automatically generated such as time, username, nature of emergency, and others.

Figure 10:
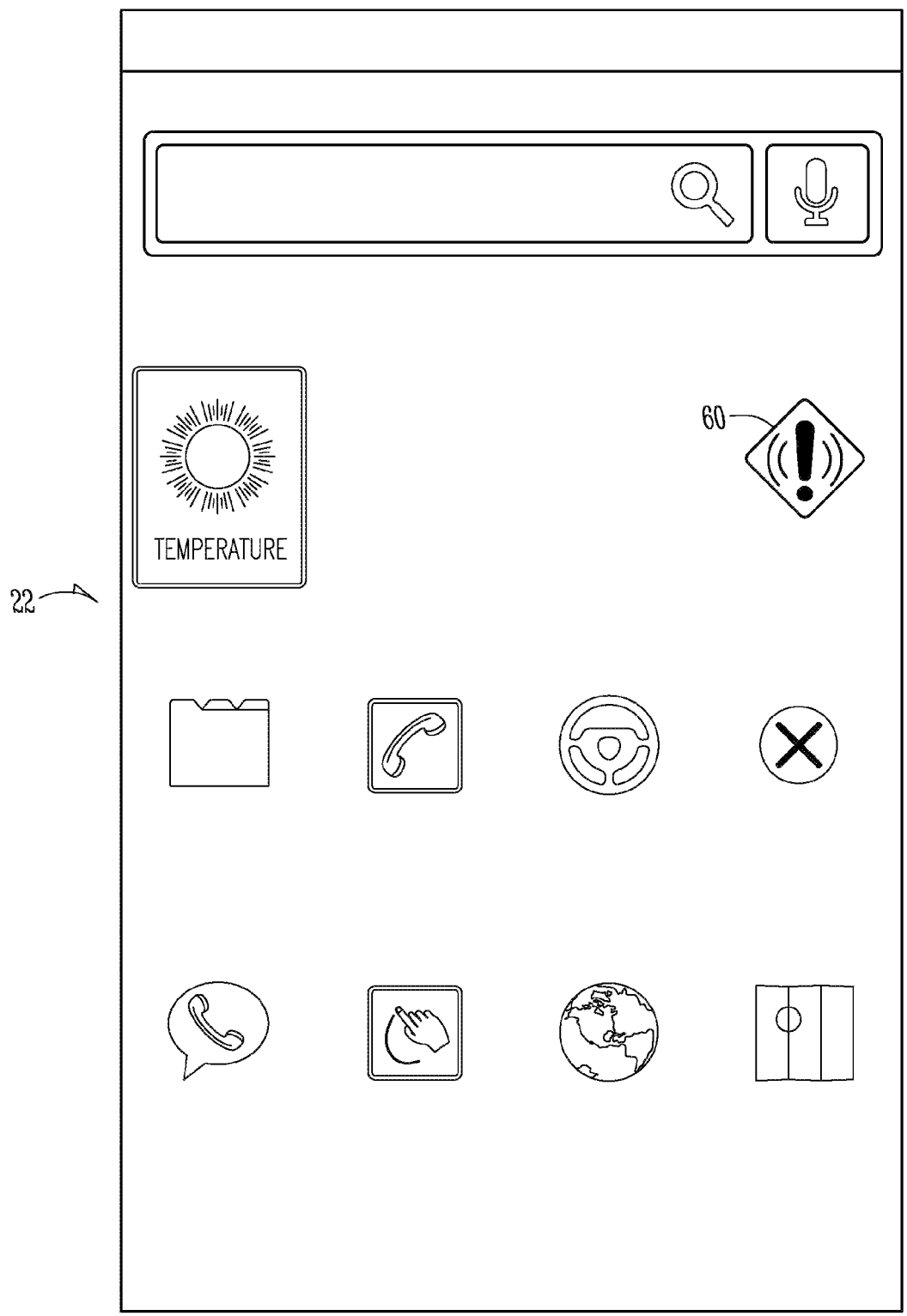
FIG. 10 shows a display screen of a telephone or a telephone system according to the present invention at a main menu.
Figure 11:
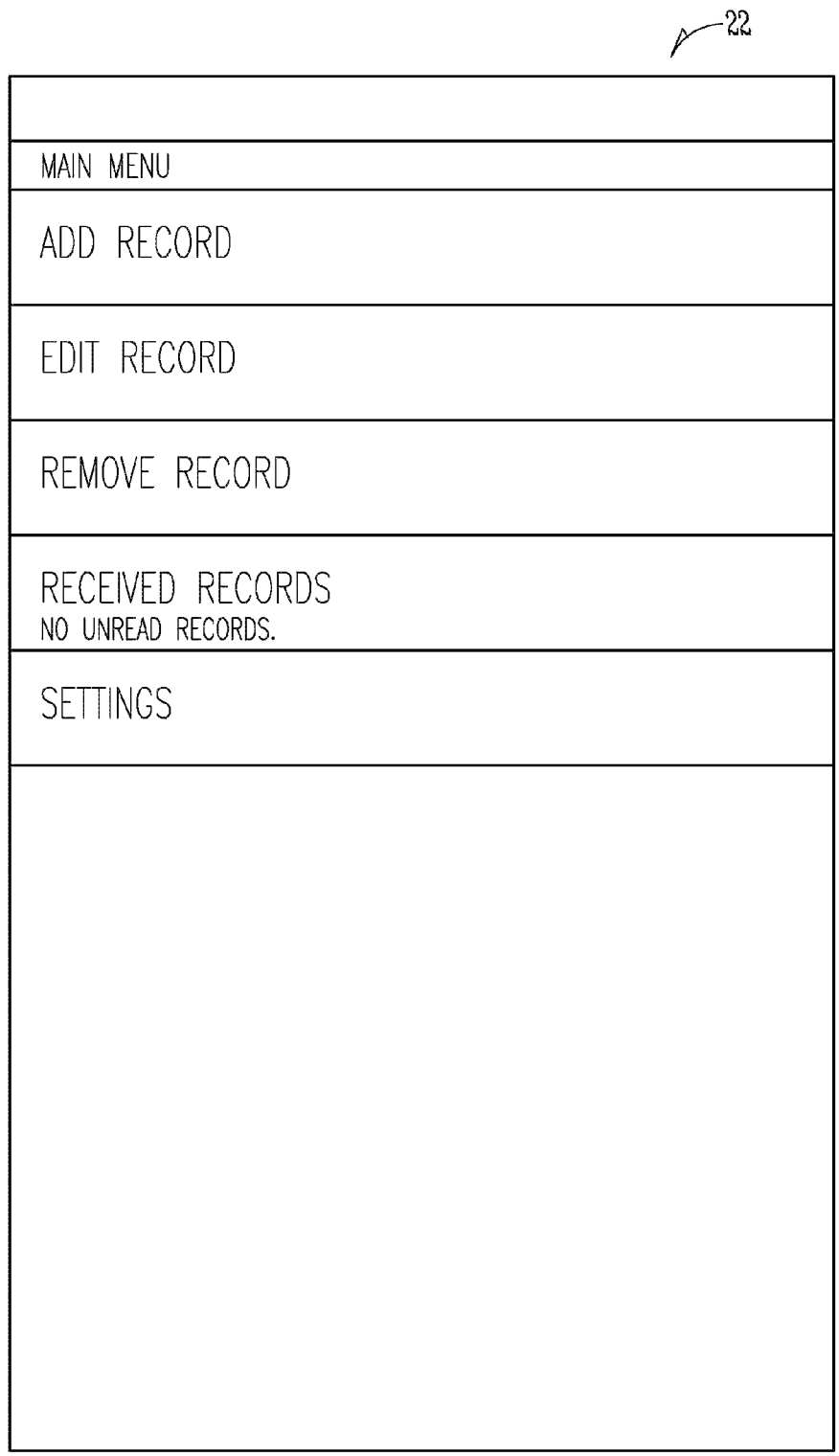
FIG. 11 shows a display screen of a telephone or a telephone system according to the present invention at a control menu for an application that permits triggering the sending of an electronic message upon initiation of a telephone call that matches a trigger number.

FIGS. 10-13 show an embodiment of various menus that can be used on the display screen 22 of a telephone or a telephone system 10 to utilize the present invention. The display screen 22 of FIG. 10 shows a main menu for the telephone or telephone system 10 that includes several icons indicating various applications that can be run on the telephone or telephone system 10. The display screen 22 may be a touch screen, such that a user can initiate the applications associated with the icons by touching or tapping on the icon. Alternatively, other mechanisms, such as a track ball and cursor system, may be used to select the icons. An icon 60 associated with an application that will generate and send an electronic message upon the initiation of a telephone call is indicated at item 60 of FIG. 10. Accordingly, selecting icon 60 will launch the application and take a user to the main application menu shown in FIG. 11. The main application menu shown in FIG. 11 provides several options. The user may add a trigger record (see, for example, FIGS. 4 and 12). The user may edit a record (see, for example, FIGS. 6 and 13).

A user may completely remove a trigger record if it is no longer desired. A user can review trigger records that have been proposed or sent to the user by third parties. Or the user may edit certain settings associated with the application, such as the visual appearance, the default message, and other features.

FIG. 12 shows the screen 22 that appears when a user is adding a new trigger record or editing an existing record. This menu includes selections for setting the trigger number, setting the elections message, the setting the recipients for the message, and for saving the record once all desired settings have been made.

Figure 13:
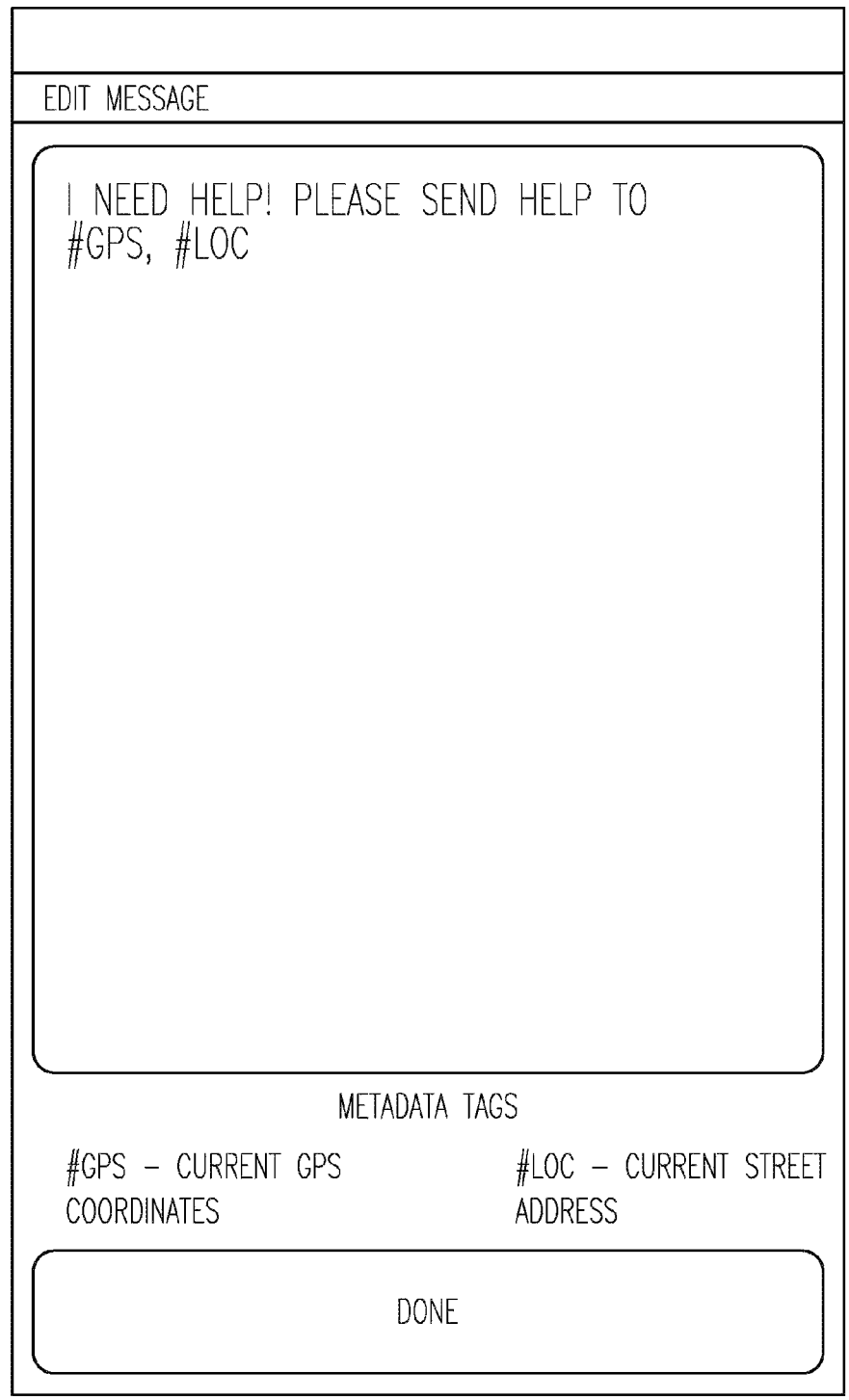
FIG. 13 shows a display screen of a telephone or a telephone system according to the present invention at an edit message mode.

FIG. 13 shows a screen 22 that is used to create and edit the electronic message that will get sent to the target recipients when the trigger number is dialed. As shown, the message may include text, and metadata tags. The user can directly type in and enter the text they want in the message. Additionally, they can select the metadata tags to be inserted as part of the message. In the example shown, the metadata tags are current GPS coordinates of the telephone at the time the message is being sent, or the GPS coordinates translated into a current or closest street address at the time the message is sent. As noted above, other tags can be defined to correspond to any other additional data that can be automatically generated such as time, username, nature of emergency, and others.

Those of skill in the art will be aware of additional standard features that could be added to the application, such as password protection. Those of skill in the art will be aware of numerous layouts and interfaces that can advantageously utilize the invention.

The presently preferred embodiments of the invention have been described with a degree of particularity. The foregoing description is of preferred examples for implementing the invention only, and the scope of the invention should not be limited by this description. The scope of the invention is defined by the scope of the following claims.

What is claimed is:

1. A telephone system comprising:
an electronic storage medium, the electronic storage medium including a trigger record database that has a first trigger record that includes a first trigger number indicator and a first application indicator associated with a first application and with the first trigger number indicator;
a computer processor that monitors an outgoing telephone call and compares a telephone number of the outgoing telephone call with the first trigger number indicator; the computer processor adapted to launch the first application if the telephone number of the outgoing telephone call matches the first trigger number indicator, the first application being an electronic message generating application; and
wherein the database further includes a second trigger record that includes a second trigger number indicator and a second application indicator associated with a second application and with the second trigger number indicator, the second application being a mapping application that utilizes GPS data corresponding to a location of the telephone system; the computer processor adapted to launch the second application if the telephone number of the outgoing telephone call matches the second trigger number indicator.

2. The telephone system of claim 1, wherein the first trigger number indicator corresponds to an emergency services telephone number.

3. The telephone system of claim 1, wherein the instruction to launch a first application comprises an instruction to transmit a first predefined electronic message including a data tag to a first destination address.

4. The telephone system of claim 3, wherein the electronic message generating application is a text message generating application.

5. The telephone system of claim 3, wherein the electronic message generating application is an e-mail generating application.

6. The telephone system of claim 3, wherein the data tag includes an indicator of a geographic location of the telephone system.

7. The telephone system of claim 1, wherein the instruction to launch a first application comprises an instruction to transmit a first predefined electronic message to a plurality of destination addresses.

8. The telephone system of claim 1, wherein the electronic storage medium and the computer processor are located in a single telephone.

9. A telephone comprising:
an electronic storage medium including a database comprising a predefined electronic message including a data tag at a location specified by is user within the electronic message associated with a trigger number and a destination address;
a transmitter for transmitting electronic messages;
a processor for monitoring outgoing telephone calls and for signaling the transmitter to send the predefined electronic message including information based on the data tag at the specified location within the electronic message to the destination address when an outgoing telephone call is initiated to the trigger number.

10. The telephone according to claim 9, wherein the trigger number corresponds to an emergency services telephone number.

11. The telephone according to claim 9, wherein the telephone further comprises a GPS receiver and wherein the information based on the data tag includes an indicator of a location of the telephone.

12. The telephone of claim 9, wherein the predefined electronic message is associated with a second destination address, and wherein if an outgoing telephone call is initiated that corresponds to the trigger number the processor signals the transmitter to send the predefined electronic message to the second destination address.

13. The telephone of claim 9 wherein the predefined electronic message is sent without interrupting the outgoing telephone call.

14. The telephone of claim 9, wherein the database further includes a second predefined electronic message associated with a second trigger telephone number and a second destination address; the processor adapted to send the second predefined electronic message to the second destination address, different than the first destination address, when an outgoing telephone call is initiated to the second trigger number.

15. A method of sending electronic messages from a telephone that has an electronic storage medium, a computer processor, and a transmitter for transmitting electronic messages, the method comprising:
inputting a trigger number, an electronic message, a data tag at a position selected by a user within the electronic message, and an electronic message destination address into a database on the electronic storage medium;
initiating a telephone call by inputting a telephone number into the telephone;

comparing the telephone number with the trigger number using the computer processor;

wherein after initiating the telephone call, the data tag causes the computer processor to add additional information to the electronic message if the telephone number matches the trigger number; and wherein if the telephone number matches the trigger number, sending the electronic message including the additional information to the electronic message destination address using the transmitter.

16. The method of claim 15, wherein the trigger number corresponds to an emergency services provider.

17. The method according to claim 15, wherein the electronic message includes an indicator of a location of the telephone.

18. The method according to claim 15, further comprising inputting a plurality of additional electronic message destination addresses associated with the trigger number and, if the telephone number matches the trigger number, sending the electronic message to each of the additional electronic message destination addresses using the transmitter.

19. The method according to claim 15, further comprising inputting a second trigger number, a second electronic message, and a second electronic message destination address and, if the telephone number matches the second trigger number, sending the second electronic message to the second electronic message destination address using the transmitter.

20. The method according to claim 15, further comprising displaying a countdown timer with an option to cancel the electronic message before sending the electronic message.

21. The method according to claim 15, wherein the additional information is a geographic location of the telephone.

* * * * *

UNITED STATES PATENT AND TRADEMARK OFFICE
CERTIFICATE OF CORRECTION

PATENT NO.        : 8,467,500 B2
APPLICATION NO.   : 12/784127
DATED             : June 18, 2013
INVENTOR(S)       : Robert S. Hidajat It is certified that error appears in the above-identified patent and that said Letters Patent is hereby corrected as shown below:

In the Claims:

<u>Col 12, Claim 9, Line 24</u>:
DELETE after by "is"
ADD after by --a--

Signed and Sealed this
Eighth Day of October, 2013

Teresa Stanek Rea
*Deputy Director of the United States Patent and Trademark Office*